(12) United States Patent
Chu

(10) Patent No.: US 7,426,606 B2
(45) Date of Patent: Sep. 16, 2008

(54) METHOD, APPARATUS AND SYSTEM FOR REVERTING FAT CLUSTER NUMBER TO FILE ID AND OFFSET OF NON-FAT FLASH FILE SYSTEM

(75) Inventor: He Chu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 347 days.

(21) Appl. No.: 11/395,124

(22) Filed: Mar. 31, 2006

(65) Prior Publication Data

US 2007/0233936 A1    Oct. 4, 2007

(51) Int. Cl.
*G06F 12/10* (2006.01)
(52) U.S. Cl. .................. 711/103; 711/202; 707/205
(58) Field of Classification Search .............. None
See application file for complete search history.

(56) References Cited

U.S. PATENT DOCUMENTS

| | | | |
|---|---|---|---|
| 5,987,478 A * | 11/1999 | See et al. ............. | 707/205 |
| 6,704,838 B2 * | 3/2004 | Anderson ............. | 711/114 |
| 2006/0149902 A1 * | 7/2006 | Yun et al. ............. | 711/118 |
| 2006/0184720 A1 * | 8/2006 | Sinclair et al. ........ | 711/103 |
| 2007/0033375 A1 * | 2/2007 | Sinclair et al. ........ | 711/203 |
| 2007/0143571 A1 * | 6/2007 | Sinclair et al. ........ | 711/203 |
| 2007/0150662 A1 * | 6/2007 | Hara et al. ............ | 711/137 |
| 2008/0082488 A1 * | 4/2008 | Terrell ................. | 707/3 |

* cited by examiner

*Primary Examiner*—Jack A Lane
(74) *Attorney, Agent, or Firm*—Blakely, Sokoloff, Taylor & Zafman LLP

(57) ABSTRACT

A device includes a processor connected to a memory. The device further includes a module having a process. The module is integrated in a Multimedia File Manager (MFM). The process operates to allow an external computer access to MFM volumes in the memory. A method includes reverting a file allocating table (FAT) cluster number to a file ID and file offset of a non-FAT flash memory file system.

12 Claims, 5 Drawing Sheets

```
struct FAT_FILE{
    UINT32 id;
    UINT32 starting;
    UINT32 end;
    UINT32 last;
    UINT32 following;
    UINT32 type;

FAT_FILE* next;
};
```

Data structure: FAT file list

METHOD, APPARATUS AND SYSTEM FOR REVERTING FAT CLUSTER NUMBER TO FILE ID AND OFFSET OF NON-FAT FLASH FILE SYSTEM

BACKGROUND

1. Field

The embodiments relate to devices that support file allocating tables (FAT) and devices the support a non-FAT file system, and more particularly to a process that operates to allow a device that supports FAT access to Multimedia File Manager (MFM) volumes in the memory of the device supporting a non-FAT file system.

2. Description of the Related Art

Currently, typical flash memory in cellular telephones is managed by various flash file systems, such as Multimedia Flash Manager (MFM), but not a FAT file system. This is because a FAT file system is not suitable for flash memory. MFM is a flash file system developed by FPG of Intel, and released in Flash Data Integrator (FDI) 7.1. FAT, however, is the default file system on universal serial bus (USB) mass storage devices for Microsoft Windows® current operating systems as well as many other operating systems. For reading and writing data in a flash file system, installation of an additional USB device driver is necessary in computer devices, such as a personal computer (PC).

A FAT file system converts file operations to sector read and write operations, in order to store data in physical storage device sector by sector.

BRIEF DESCRIPTION OF THE DRAWINGS

The embodiments are illustrated by way of example, and not by way of limitation, in the figures of the accompanying drawings and in which like reference numerals refer to similar elements and in which.

DETAILED DESCRIPTION

The embodiments discussed herein generally relate to devices that revert a file allocating table (FAT) cluster number to a file ID and file offset of a non-FAT flash memory file system. Referring to the figures, exemplary embodiments will now be described. The exemplary embodiments are provided to illustrate the embodiments and should not be construed as limiting the scope of the embodiments.

Figures 1, 2:
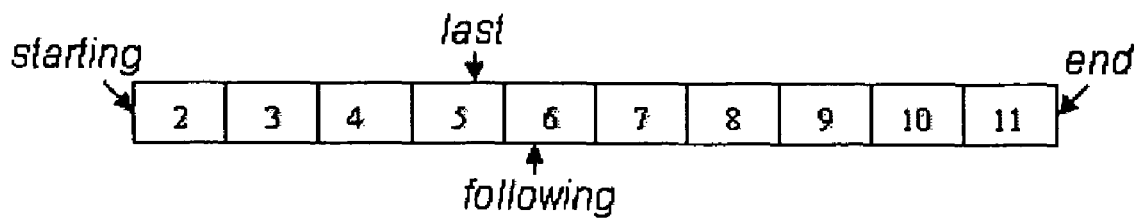
FIG. 1 illustrates a data structure of a file allocating table (FAT) file list.
FIG. 2 illustrates key cluster numbers in a FAT file system.

FIG. 1 illustrates the data structure of a FAT file list used by an embodiment. The data structure includes starting cluster number, end cluster number, last cluster number, and following cluster number. Starting means the first cluster used by a file. End means the last cluster used by the file. Last means the last cluster of the file that has been written to a flash file system. Following means the next cluster that would be accessed by an external device supporting a FAT file system, such as a personal computer (PC), a hand held computer, a personal digital assistant (PDA) and a lap top computer, where the external computer supports a FAT file system and universal serial bus (USB) mass storage devices. Offset is following cluster's offset in the file from the header of the file. Id is the file's identification in a flash file system. Type is used to save some flags for use in processes of embodiments. In one embodiment all files are saved in a single linked list sorted by id.

In one embodiment a FAT cluster number is reverted to file id and offset of the non-FAT flash file system. The data structure and processes of embodiments can revert file position quickly. In one embodiment, in the progress of copying a file, sectors are written in sequence. In this embodiment, no holes will exist in any file. Therefore, only a part of data written into the file of the flash file system may exist. The last cluster number points to the last cluster that has been written to the flash file system. After a cluster is written to the flash file system, we will update the last cluster number to its next cluster number. The following cluster number is used to optimize the reverting process. The following cluster number points to the cluster that would be accessed by the external device in the next sector read or write operation.

FIG. 2 illustrates clusters 2-11 of a FAT file system for use in an example. Suppose a file occupies 10 clusters (e.g., 2~11) in a FAT file system, and only clusters 2~5 are written into the flash file system in a device, such as a cellular telephone. At that time, the four key cluster numbers are illustrated in FIG. 2 as starting (cluster 2), last (cluster 5), following (cluster 6), and end (cluster 11).

Figure 3:
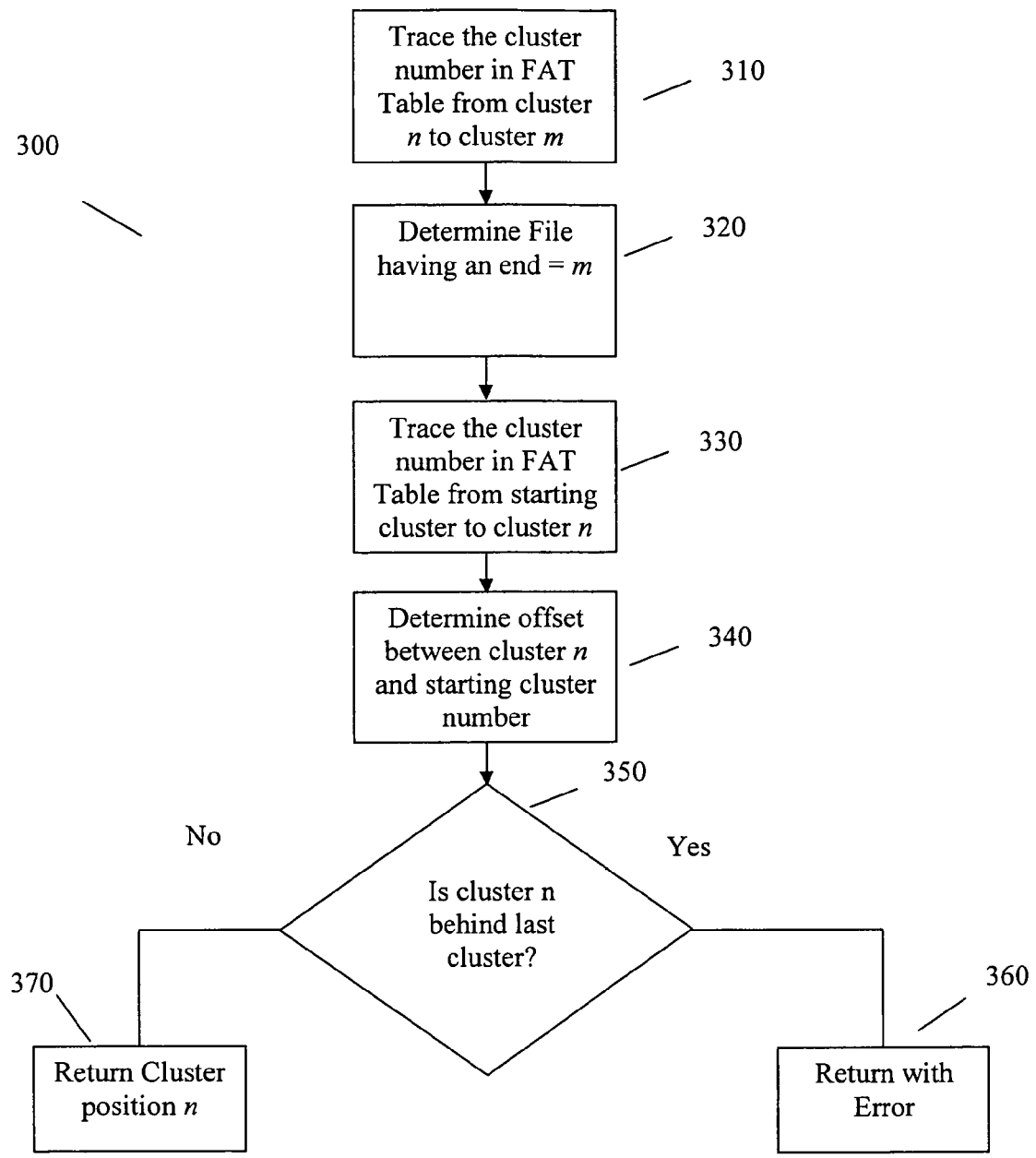
FIG. 3 illustrates a block diagram of a process of an embodiment.

Based on the embodiment data structure, different embodiment processes are used to revert a FAT cluster number to file id and offset of the flash file system. FIG. 3 illustrates a block diagram of a process of an embodiment. With process 300, we denote the process as FindPosition (n), where n is the FAT cluster number. With process 300 the FAT cluster number can be reverted to the corresponding file id and offset of the flash file system as follows.

Process 300 begins with block 310 where the cluster number is traced in a FAT table from cluster n to an EOF (end of file) cluster m. Process 300 continues with block 320 where the file list is searched to determine the file whose end is equal to m. Next, in block 330 the cluster number is traced in the FAT table from starting cluster number of the file to cluster n. Process 300 continues with block 340 where the offset between cluster n and the starting cluster number of the file is determined/calculated.

In block 350, if cluster n is behind the last cluster number of the file, an error is returned because cluster n does not exist in any file of the flash file system. Otherwise, the cluster position n is returned. With process 300 id and offset are determined quickly without scanning the whole FAT table to find the cluster n. However, the larger the file is, the more time is necessary to spend on process 300. The time complexity of process 300 is O(n).

Figure 4:
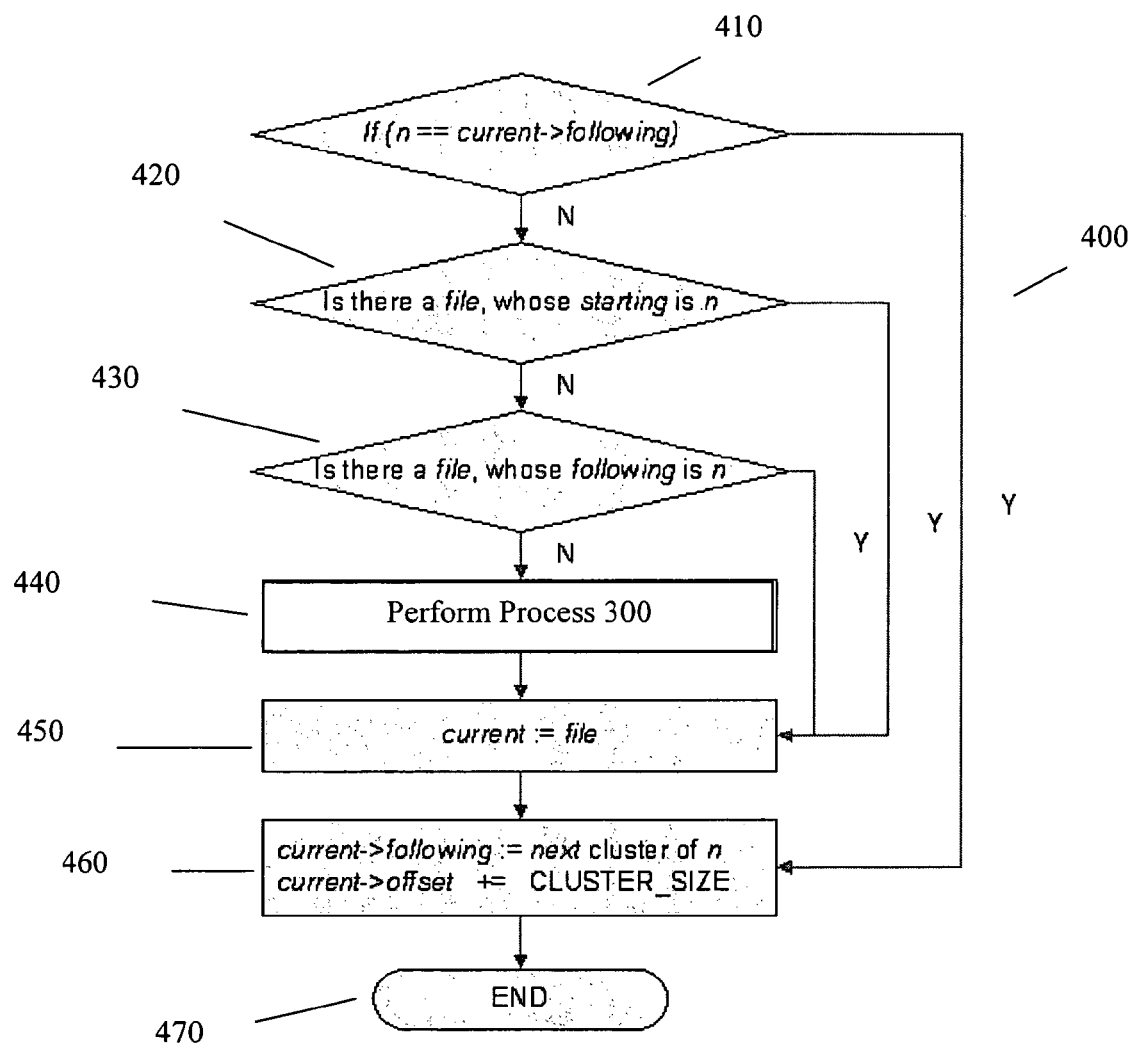
FIG. 4 illustrates a block diagram of another process of an embodiment.

FIG. 4 illustrates an optimized embodiment of process 300. Since most of the sector read and write operations are continuous in one file, in this embodiment it is possible to guess the following cluster number to be accessed by a FAT in a computer, such as a PC. For example, suppose file 1 contains two clusters: 2, and 3. If cluster 2 is accessed, we set following of file 1 to cluster 2 because it is the most likely cluster to be accessed in the next sector read and write operation. In this case, the file id and offset are obtained rather quickly without scanning any FAT. The optimized FindPostion(n) process is described as follows, and its time complexity is denoted as O(1).

Process 400 begins with block 410. In block 410 if it is determined that cluster n==current→following, process 400 continues with block 460 where current→following is set to the next cluster of n and current→offset is increased by CLUSTER_SIZE. Otherwise, process 400 continues with block 420. In block 420 the file list is searched for a file having a starting cluster of n. If a file is found with a starting cluster of n, process 400 continues with block 450 where current is set to the file found, and block 460 where following and offset is updated. Otherwise process 400 continues with block 430.

In block 430, the file list is searched for a file having its following equal to n. If a file is found with its following equal to n, process 400 continues with block 450. Otherwise, process 40 continues with block 440 where process 300 is performed. After process 300 is performed in block 440, process 400 continues with block 450 where current is set to file. Process 400 then continues with block 460 and then process 400 ends.

In another embodiment, when a FAT file system writes a sector in a FAT region, the end cluster number and last cluster number of relevant files are updated. These sectors are stored in a FAT image file in the flash file system. After updating the FAT table, all variables used in FindPosition(n) are reset, such as current and following, because these variables may be invalid for the new FAT table.

In another embodiment, the FAT file system only modifies the first character of a file name to 0xe5 to delete a file. In this embodiment when moving a file to another directory, the FAT file system also marks the first character to 0xe5 first, and then creates another file in a destination directory with the same attribution and starting cluster number. Therefore, when a file is deleted in the flash file system when its first character is marked 0xe5, this file is lost because it is un-recoverable in flash file system. In this embodiment, instead of deleting the file, a flag is set on the file's type when its first character is marked as 0xe5. In this embodiment, the file is denoted as a temporary file. When the file's FAT entries are cleared to 0, the temporary file can be deleted in the flash file system.

When FAT system creates another file whose attribution and starting cluster number are the same as the temporary file, the temporary file is moved to the destination directory, and then the flag is reset on the moved file. In this embodiment the process can avoid losing files and data in the flash file system.

Figure 5:
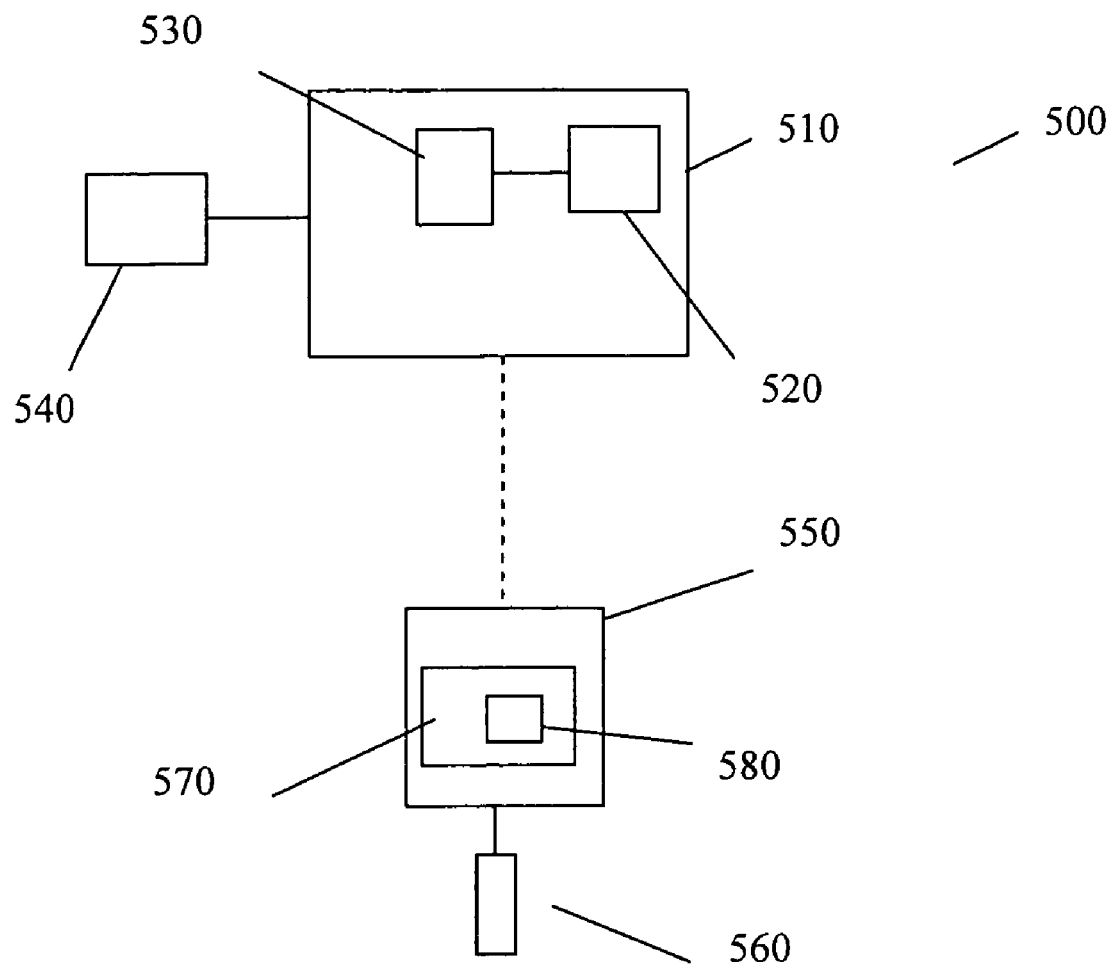
FIG. 5 illustrates an embodiment of an apparatus.

FIG. 5 illustrates an embodiment of a device. Device 500 includes processor 550 connected to memory 560. In this embodiment, memory 560 is a nonvolatile memory that can be erased and reprogrammed in units of memory called blocks. This type of memory is can be a variation of electrically erasable programmable read-only memory EEPROM also known as flash memory. Device 500 further includes module 580 having a process, such as process 300 or process 400. Module 580 is integrated in MFM 570. In this embodiment the process operates to allow external computer 510 access to MFM volumes in memory 560. That is, the process reverts sector operations, which come from external computer 510, to file operations, which will be executed by MFM 570.

In one embodiment module 580 is a mountable universal serial bus (USB) module. In this embodiment external computer 510 can be a personal computer (PC), a hand held computer, a personal digital assistant (PDA), a lap top computer, etc. External computer 510 supports a FAT file system and USB mass storage devices. Memory 560 is managed by a non FAT file system. External computer 510 includes memory 540, processor 520 and FAT file system manager 530. Memory 540 can be local random access memory (RAM), synchronous RAM (SRAM), dynamic RAM (DRAM), fast page mode DRAM (FPM DRAM), Extended Data Out DRAM (EDO DRAM), Burst EDO DRAM (BEDO DRAM), erasable programmable ROM (EPROM) also known as Flash memory, etc.

Figure 6:
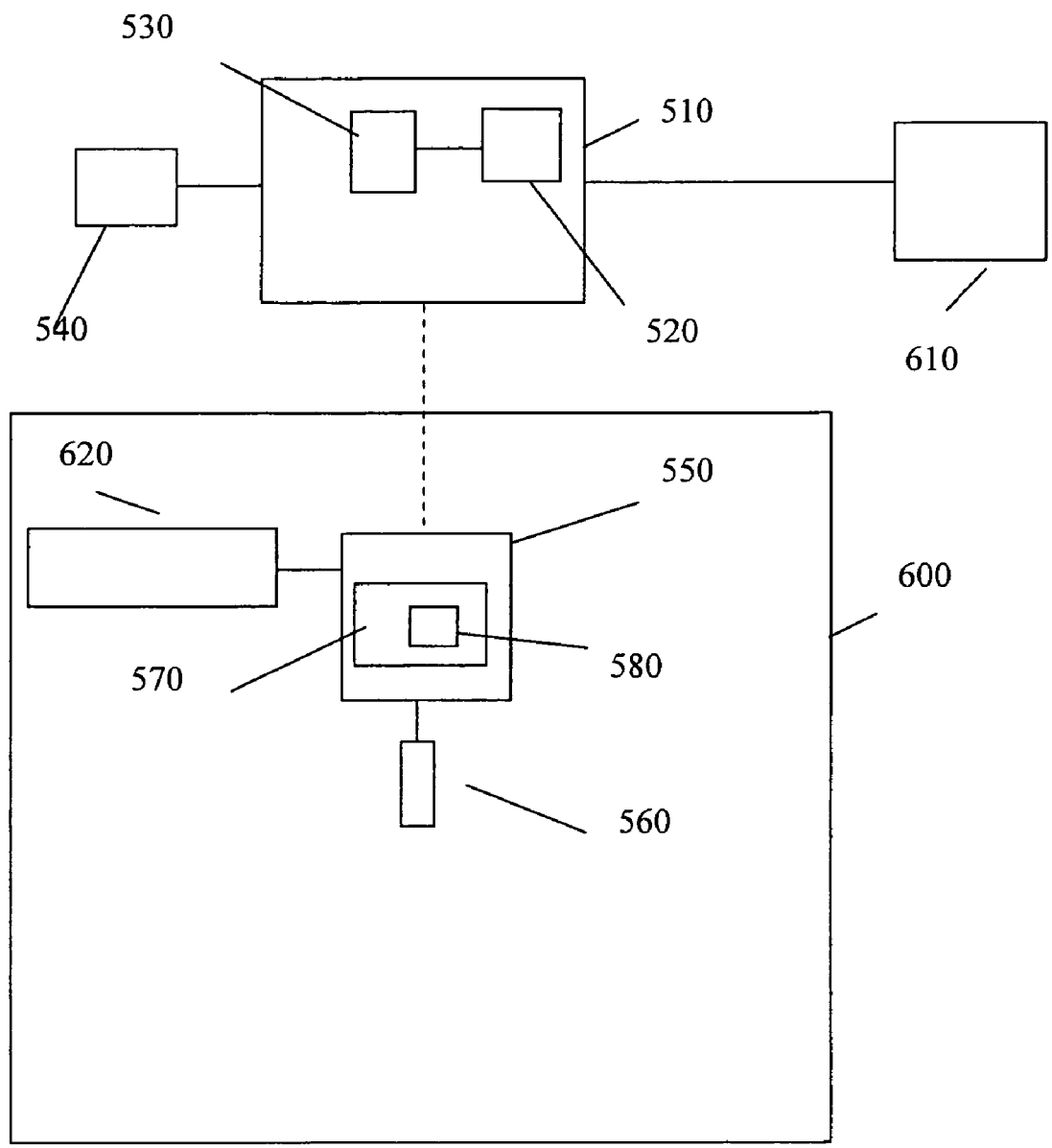
FIG. 6 illustrates an embodiment of system.

FIG. 6 illustrates system 600. System 600 includes device 500 connected to a display. Display 620 can be an analog electronic display, a digital electronic display a vacuum fluorescent (VF) display, a light emitting diode (LED) display, a plasma display (PDP), a liquid crystal display (LCD), a high performance addressing (HPA) display, a thin-film transistor (TFT) display, an organic LED (OLED) display, a heads-up display (HUD), etc. In this embodiment external computer 510 is connected to a USB mass storage device 610.

Embodiments described above including data structure, devices, systems and processes are used in MUSB, which is a sub-module of MFM. MUSB makes data in the flash file system accessible by an external device (e.g., a PC). MUSB is integrated into MFM, and then external computer 510 can access MFM volumes. Since MFM volumes are not accessible from external computers that support a FAT file system, the above described embodiment makes it easier to exchange data from a system supporting a non-FAT file system with external computers 510 (e.g., a PC), especially for cellular telephone products. With the above described embodiments external computers (e.g., PC) can access files in a non-FAT flash file system without requiring any specific USB drivers to be installed in external computer 510.

System 600 reverts sector read and write operations to file operations in a USB device (e.g. a cellular telephone), and then calls a corresponding application programming interface (API) of the flash file system to achieve the same file operation launched by a FAT file system in external computer 510. For example, when external computer 510 is a PC and writes a sector of data to the 60th sector, and the above embodiments determine that it is the fourth sector of a file in the flash file system, this sector of data can be written to the file at a proper offset.

Embodiments of the present disclosure described herein may be implemented in circuitry, which includes hardwired circuitry, digital circuitry, analog circuitry, programmable circuitry, and so forth. These embodiments may also be implemented in computer programs. Such computer programs may be coded in a high level procedural or object oriented programming language. The program(s), however, can be implemented in assembly or machine language if desired. The language may be compiled or interpreted. Additionally, these techniques may be used in a wide variety of networking environments. Such computer programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosure may also be considered to be implemented as a machine-readable or machine recordable storage medium, configured for use with a processing system, where the storage medium so configured causes the processing system to operate in a specific and predefined manner to perform the functions described herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

What is claimed is:

1. A method comprising:
reverting a file allocating table (FAT) cluster number to a file ID and file offset of a non-FAT flash memory file system.

2. The method of claim 1, the reverting comprising:
tracing a cluster number in the FAT from a first cluster number to a second cluster number;
determining a file having an end cluster equal to the second cluster number;
tracing the FAT from a starting cluster number to the first cluster number; and
determining an offset from the first cluster number and the starting cluster number.

3. The method of claim 2, further comprising:
returning an error if the first cluster number is behind a last cluster number in a file.

4. The method of claim 1, the reverting comprising:
determining a file ID and file offset of a file in a flash memory by an external computer supporting a FAT without tracing the FAT.

5. The method of claim 1, the reverting comprising:
storing a FAT image file in a flash file system;
updating the FAT in an external computer; and
resetting a first cluster number, a current cluster number and a following cluster number.

6. The method of claim 1, the reverting comprising:
setting a flag on type field of a first file if a first character of the first file is set to a predetermined value;
creating a second file having a same attribution and cluster number as the first file;
moving the first file to a destination directory,
resetting the flag on the moved first file; and
deleting the first file if FAT entries are cleared to "0".

7. A machine-readable storage medium containing instructions that, when executed, cause a machine to:
revert a file allocating table (FAT) cluster number to a file ID and file offset of a non-FAT flash memory file system.

8. The machine-readable storage medium of claim 7, wherein the instructions causing the machine to revert further comprising instructions that cause the machine to:
trace a cluster number in the FAT from a first cluster number to a second cluster number;
determine a file having an end cluster equal to the second cluster number;
trace the FAT from a starting cluster number to the first cluster number; and
determine an offset from the first cluster number and the starting cluster number.

9. The machine-readable storage medium of claim 8, further comprising instructions that cause the machine to:
return an error if the first cluster number is behind a last cluster number in a file.

10. The machine-readable storage medium of claim 7, wherein the instructions causing the machine to revert further comprising instructions that cause the machine to:
determine a file ID and file offset of a file in a flash memory by an external computer supporting a FAT without tracing the FAT.

11. The machine-readable storage medium of claim 7, wherein the instructions causing the machine to revert further comprising instructions that cause the machine to:
store a FAT image file in a flash file system;
update the FAT in an external computer; and
reset a first cluster number, a current cluster number and a following cluster number.

12. The machine-readable storage medium of claim 7, wherein the instructions causing the machine to revert further comprising instructions that cause the machine to:
set a flag on type field of a first file if a first character of the first file is set to a predetermined value;
create a second file having a same attribution and cluster number as the first file;
move the first file to a destination directory,
reset the flag on the moved first file; and
delete the first file if FAT entries are cleared to "0".

* * * * *